(12) United States Patent
Ito et al.

(10) Patent No.: US 8,153,727 B2
(45) Date of Patent: Apr. 10, 2012

(54) BLOCK COPOLYMER, RESIN COMPOSITION COMPRISING SAME, AND PROCESS FOR PRODUCING THE RESIN COMPOSITION

(75) Inventors: Kazuya Ito, Tokyo (JP); Hidenori Yamagishi, Tokyo (JP); Masao Nakamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 675 days.

(21) Appl. No.: 11/920,163

(22) PCT Filed: May 8, 2006

(86) PCT No.: PCT/JP2006/309235
§ 371 (c)(1),
(2), (4) Date: Feb. 5, 2009

(87) PCT Pub. No.: WO2006/120995
PCT Pub. Date: Nov. 16, 2006

(65) Prior Publication Data
US 2009/0247700 A1  Oct. 1, 2009

(30) Foreign Application Priority Data

May 11, 2005 (JP) ................................. 2005-138772

(51) Int. Cl.
*C08F 297/04* (2006.01)
*C08L 53/02* (2006.01)
(52) U.S. Cl. ............................. 525/93; 525/98; 525/271
(58) Field of Classification Search .................... 525/71, 525/98, 99, 271, 93
See application file for complete search history.

(56) References Cited

U.S. PATENT DOCUMENTS

| | | | |
|---|---|---|---|
| 4,433,109 A * | 2/1984 | Takeuchi et al. | 525/314 |
| 4,940,756 A * | 7/1990 | Broekhuis et al. | 525/237 |
| 5,011,888 A * | 4/1991 | Tsutsumi et al. | 525/98 |
| 5,096,973 A * | 3/1992 | Herrmann et al. | 525/314 |
| 5,461,095 A | 10/1995 | Van Dongen et al. | |
| 5,658,987 A | 8/1997 | Nakamura et al. | |
| 6,031,053 A | 2/2000 | Knoll et al. | |
| 6,180,717 B1 | 1/2001 | Kawazura et al. | |
| 6,355,728 B1 * | 3/2002 | Kawazura et al. | 525/98 |
| 6,369,160 B1 | 4/2002 | Knoll et al. | |
| 2003/0211308 A1 * | 11/2003 | Khandpur et al. | 428/317.3 |
| 2009/0318597 A1 * | 12/2009 | Squire et al. | 524/261 |

FOREIGN PATENT DOCUMENTS

| | | |
|---|---|---|
| JP | 5-331247 A | 12/1993 |
| JP | 10-36465 A | 2/1998 |
| JP | 10-204136 A | 8/1998 |
| JP | 10-265537 A | 10/1998 |

* cited by examiner

*Primary Examiner* — Jeffrey Mullis
(74) *Attorney, Agent, or Firm* — Birch, Stewart, Kolasch & Birch, LLP

(57) ABSTRACT

A block copolymer comprised of a polymer block or blocks (A) comprising conjugated diene monomer units and a polymer block or blocks (B) comprising conjugated diene monomer units and aromatic vinyl monomer units, wherein (1) the polymer block or blocks (A) have a glass transition temperature in the range of −88 to −45° C., (2) the polymer block or blocks (B) have a glass transition temperature in the range of 30 to 90° C., (3) the content of aromatic vinyl monomer units in the block copolymer is in the range of 30 to 52% by weight based on the total weight of the block copolymer, (4) the block copolymer has an aromatic vinyl block ratio of smaller than 69% by weight based on the total weight of the block copolymer, and (5) the viscosity of a 5% by weight solution of the block copolymer in styrene is at least 5 mPa·s but smaller than 30 mPa·s. This block copolymer is used as a modifier for resin.

27 Claims, No Drawings

US 8,153,727 B2

BLOCK COPOLYMER, RESIN COMPOSITION COMPRISING SAME, AND PROCESS FOR PRODUCING THE RESIN COMPOSITION

TECHNICAL FIELD

This invention relates to a block copolymer, a resin composition comprising the block copolymer, and a process for producing the resin composition. More particularly, it relates to a block copolymer which can be easily dried in the course of production thereof, and, when the block copolymer is used for a modifier for resin, it gives a resin composition having improved impact resistance and transparency; a resin composition comprising the block copolymer; and a process for producing the resin composition.

BACKGROUND ART

Styrene resins have good shapability and good mechanical properties, and are inexpensive, therefore, they are widely used. Especially a styrene resin modified with polybutadiene exhibits excellent impact resistance and widely used in home electric appliances. However, a problem arises such that the impact resistance is enhanced but transparency drastically decreases with incorporation of the polybutadiene modifier.

Several proposals have been made to solve the above-mentioned problem. For Example, a method of modifying a styrene resin by incorporating therein a styrene-butadiene block copolymer prepared by using an alkali metal catalyst such as n-butyllithium has been proposed (see, for example, Japanese Unexamined Patent Publication (hereinafter abbreviated to "JP-A") S63-48317, JP-A H1-172413 and JP-A H5-331349). According to this method, styrene-butadiene rubber panicles dispersed in the styrene resin have a particle diameter smaller than that in the case when the polybutadiene modifier is incorporated, and consequently the rubber particles give a modified resin having an improved transparency.

Another proposal of providing a styrene resin having improved transparency and impact resistance has been made wherein an aromatic vinyl monomer such as styrene, methyl methacrylate and an acrylic acid alkyl ester are graft-copolymerized in the presence of a block copolymer such as a styrene-butadiene block copolymer (sec, for example, JP-A S62-169812).

DISCLOSURE OF THE INVENTION

Problems to Be Solved by the Invention

The block copolymers as disclosed in JP-A S63-48317, JP-A H1-172413, JP-A H5-331349 and JP-A S62-169812 have a problem such that the block copolymer is difficult to dry with good efficiency when an extruder is used as in the conventional manner in the production process thereof. Therefore, an enhanced energy is required at the drying step in the process for producing the block copolymers, and the dried block copolymers still contain some amount of moisture and other volatile ingredients which results in reduction of transparency of the styrene resin.

To solve the above-mentioned problem, i.e., the difficulty in drying property of the block copolymer, a method is known wherein a rubbery polymer such as polybutadiene is incorporated in the styrene-butadiene block copolymer before the block copolymer is dehydrated and dried, and then, the rubbery polymer-incorporated styrene-butadiene block copolymer is dehydrated and dried to give a rubbery polymer composition (see JP-A H5-331349). However, this method has a problem such that, when the rubbery polymer composition is incorporated in a styrene resin, the rubbery polymer such as polybutadiene reduces the transparency of the styrene resin.

An object of the present invention is to provide a block copolymer which is capable of being easily dried in the production process, and, when it is used as a modifier for a resin, which is capable of giving a resin composition having improved impact resistance and transparency.

Means for Solving the Problems

The present inventors made extensive researches and found that the above-mentioned object can be attained by providing a block copolymer comprising a combination of two polymer blocks comprising specific monomer units and having different specific glass transition temperatures, which has a specific content of aromatic vinyl monomer units, a specific aromatic vinyl monomer block ratio and a specific viscosity of 5 weight % solution in styrene. The present invention has been completed based on the above-mentioned finding.

Thus, in accordance with the present invention, there is provided a block copolymer comprised of a polymer block or blocks (A) comprising conjugated diene monomer units and a polymer block or blocks (B) comprising conjugated diene monomer units and aromatic vinyl monomer units, wherein the block copolymer satisfies the following requirements (1) through (5):

(1) the polymer block or blocks (A) have a glass transition temperature in the range of −88 to −45° C.,
(2) the polymer block or blocks (B) have a glass transition temperature in the range of 30 to 90° C.,
(3) the content of aromatic vinyl monomer units in the block copolymer is in the range of 30 to 52% by weight based on the total weight of the block copolymer,
(4) the block copolymer has an aromatic vinyl block ratio of smaller than 69% by weight based on the total weight of the block copolymer, and
(5) the viscosity of a 5% by weight solution of the block copolymer in styrene is at least 5 mPa·s but smaller than 30 mPa·s.

In accordance with the present invention, there is further provided a resin composition comprising the above-mentioned block copolymer and a base resin.

In the above-mentioned resin composition, the base resin preferably comprises methyl acrylate monomer units or methyl methacrylate monomer units, and more preferably further comprises aromatic vinyl monomer units in addition to methyl acrylate monomer units or methyl methacrylate monomer units.

In the above-mentioned resin composition, the base resin preferably further comprises units derived from acrylic acid alkyl ester monomer other than methyl acrylate monomer, or units derived from methacrylic acid alkyl ester monomer other than methyl methacrylate monomer, in addition to methyl acrylate monomer units or methyl methacrylate monomer units, or to a combination of aromatic vinyl monomer units with methyl acrylate monomer units or with methyl methacrylate monomer units.

In a further aspect of the present invention, there is provided a process for producing the above-mentioned resin composition, which comprises a step of polymerizing a monomer as raw material for forming the base resin in the presence of the above-mentioned block copolymer.

Effect of the Invention

The block copolymer of the present invention can easily be dried in the production process, and, when it is used as a modifier for a resin, it can give a resin composition having improved impact resistance and transparency.

BEST MODE FOR CARRYING OUT THE INVENTION

The block copolymer of the present invention comprises at least two kinds of polymer blocks, i.e., polymer block (A) and polymer block (B).

One of the polymer blocks constituting the block copolymer of the present invention, i.e., polymer block (A), comprises conjugated diene monomer units and has a glass transition temperature in the range of −88 to −45° C.

The monomer for forming the conjugated diene monomer units in the polymer block (A) is not particularly limited provided that the monomer is conjugated diene. As specific examples of the conjugated diene monomer, there can be mentioned 1,3-butadiene, 2-methyl-1,3-butadiene (isoprene), 2,3-dimethyl-1,3-butadiene, 2-chloro-1,3-butadiene, 1,3-pentadiene and 1,3-hexadiene. Of these, 1,3-butadiene and 2-methyl-1,3-butadiene are preferable. 1,3-Butadiene is especially preferable. These conjugated diene monomers may be used either alone or as a combination of at least two thereof.

The polymer block (A) may comprise monomer units other than conjugated diene monomer units. Especially in the case when the conjugated diene monomer units in the polymer block (A) cannot form a polymer block having a glass transition temperature in the range of −88 to −45° C., it is necessary to use monomer units other than the conjugated diene monomer units, in addition to the conjugated diene monomer units in the polymer block A. The monomer units other than the conjugated diene monomer units are not particularly limited, but said monomer units preferably include aromatic vinyl monomer units.

The monomer for forming the aromatic vinyl monomer units in the polymer block (A) includes aromatic vinyl monomers such as, for example, styrene, α-methylstyrene, 2-methylstyrene, 3-methylstyrene, 4-methyl styrene, 2-ethylstyrene, 3-ethylstyrene, 4-ethylstyrene, 2,4-diisopropylstyrene, 2,4-dimethylstyrene, 4-t-butylstyrene, 5-t-butyl-2-methylstyrene, 2-chlorostyrene, 3-chlorostyrene, 4-chlorostyrene, 4-bromostyrene, 2-methyl-4,6-dichlorostyrene, 2,4-dibromostyrene and vinylnaphthalene. Of these, styrene, α-methylstyrene and 4-methylstyrene are preferable. These aromatic vinyl monomers may be used either alone or as a combination of at least two thereof.

The polymer block or blocks (A) can comprise the conjugated diene monomer units and the aromatic vinyl monomer units at an appropriate proportion, but, the ratio of aromatic vinyl monomer units/conjugated diene monomer units is usually in the range of 0/100 to 85/15 by weight, preferably 5/95 to 70/30, and more preferably 10/90 to 40/60.

The polymer block or blocks (A) may comprise monomer units other than the conjugated diene monomer units and the aromatic vinyl monomer units, and, as specific examples of such monomer units in the polymer block or blocks (A), there can be mentioned monomer units derived from α,β-unsaturated nitriles such as acrylonitrile and methacrylonitrile; unsaturated carboxylic acids and their anhydrides such as acrylic acid, methacrylic acid and maleic anhydride; unsaturated carboxylic acid esters such as methyl methacrylate, ethyl acrylate and butyl acrylate; and non-conjugated dienes such as 1,5-hexadiene, 1,6-heptadiene, 1,7-octadiene, dicyclopentadiene and 5-ethylidene-2-norbornene. The amount of these monomer units is preferably in the range of 0 to 30% by weight based on the weight of the polymer block or blocks (A). In the case when the polymer block or blocks (A) comprise at least two kinds of monomer units, the mode in which said at least two kinds of monomer units are bonded together is not particularly limited.

The polymer block or blocks (A) must have a glass transition temperature in the range of −88 to −45° C. Preferably the glass transition temperature is in the range of −88 to −50° C. If the glass transition temperature of the polymer block or blocks (A) is too high, a resin composition comprising a base resin and the polymer block or blocks (A) is liable to have poor impact resistance.

Another of the polymer blocks constituting the block copolymer of the present invention, i.e., polymer block (B), comprises at least conjugated diene monomer units and aromatic vinyl monomer units, and has a glass transition temperature in the range of 30 to 90° C.

The monomer for forming the conjugated diene monomer units in the polymer block or blocks (B) is not particularly limited provided that the monomer is conjugated diene. The conjugated diene monomer includes, for example, those which are mentioned above as the conjugated diene monomers for the polymer block or blocks (A). Of the conjugated diene monomers, 1,3-butadiene and 2-methyl-1,3-butadiene are preferable. 1,3-Butadiene is especially preferable. The conjugated diene monomers may be used either alone or as a combination of at least two thereof.

The monomer for forming the aromatic vinyl monomer units in the polymer block or blocks (B) includes, for example, aromatic vinyl monomers which are mentioned above as the optional aromatic vinyl monomers for forming the aromatic vinyl monomer units in the polymer block or blocks (A). Of the aromatic vinyl monomers, styrene is preferable in view of more enhanced transparency of a resulting resin composition. The aromatic vinyl monomers may be used either alone or as a combination of at least two thereof.

The polymer block or block (B) can comprise the conjugated diene monomer units and the aromatic vinyl monomer units at an appropriate proportion provided that the proportion falls within the claimed range, but, the ratio of aromatic vinyl monomer units/conjugated diene monomer units is usually in the range of 99/1 to 50/50 by weight, preferably 98/2 to 60/40, and more preferably 90/5 to 70/30.

The polymer block or blocks (B) may comprise monomer units other than the conjugated diene monomer units and the aromatic vinyl monomer units, and, as specific examples of such monomer units in the polymer block or blocks (B), there can be mentioned those which are derived from the above-mentioned monomers optionally used in combination with the conjugated diene monomers and the aromatic vinyl monomers, for forming the optional monomer units in the polymer block or blocks (A). The amount of the optional monomer units is preferably in the range of 0 to 40% by weight based on the weight of the polymer block or blocks (B). The mode in which at least two kinds of monomer units in the polymer block or blocks (B) are bonded together is not particularly limited.

The polymer block or blocks B must have a glass transition temperature in the range of 30 to 90° C. Preferably the glass transition temperature is in the range of 40 to 80° C., more preferably 50 to 75° C. If the glass transition temperature of the polymer block or blocks (B) is too low, when the block copolymer is incorporated in a base resin, the particle diameter of the block copolymer within the base resin becomes difficult to control, with the result of resin composition having poor transparency. In contrast, if the glass transition temperature of the polymer block or blocks (B) is too high, the block copolymer is difficult to dry and the dried block copolymers still contain some amount of volatile ingredients, leading to reduction of transparency of the resin composition.

The block copolymer according to the present invention comprises usually at least one polymer block (A) and at least one polymer block (B). The block copolymer can comprise two or more polymer blocks (A) and two or more polymer blocks (B). The polymer block may comprise a polymer block or blocks, other than the polymer block or blocks A and the polymer block or blocks B. Such polymer block or blocks are not particularly limited, and, as specific examples thereof, there can be mentioned a polymer block having a glass transition temperature higher than 90° C., a polymer block having a glass transition temperature higher than −45° C. and lower than 30° C., a polymer block having a glass transition temperature lower than 88° C., a polymer block having a glass transition temperature in the range of −88 to −45° C. but not containing conjugated diene monomer units, and, a polymer block having a glass transition temperature in the range of 30 to 90° C. but not containing either one or both of the conjugated diene monomer units and the aromatic vinyl monomer units.

The mode in which the polymer blocks (A) and (B) and other optional blocks within the block copolymer of the present invention are bonded together is not particularly limited, and the shape of mode includes, for example, straight-chain shape, a comblike shape and starlike shape. Preferably, the block copolymer is a straight-chain block copolymer represented by the following general formulae.

$$A\text{-}B \qquad \text{General formula (1)}$$

wherein A represents the polymer block (A), and B represents the polymer block (B), $$A\text{-}(Xi)_n\text{-}B \qquad \text{General formula (2)}$$

wherein A represents the polymer block (A), B represents the polymer block (B), Xi represents a polymer block consisting only of conjugated diene monomer units or aromatic vinyl monomer units, and n is an integer of 1 to 10. The block copolymer of the general formula (1) is especially preferable in view of ease in the control of particle diameter of the block copolymer dispersed in a base resin. In the case of the block copolymer of the general formula (2), the ratio of [(weight of polymer block A)+(weight of polymer block B)]/(total weight of n number of polymer blocks Xi) is preferably at least 1, more preferably at least 4.

In the block copolymer of the present invention, the ratio of [weight of polymer block or blocks (A)]/[weight of polymer block or blocks (B)] is preferably in the range of 0.43 to 9.0, more preferably 0.67 to 5.7 and especially preferably 1.0 to 4.0. Note, in the case when the block copolymer comprises two or more polymer blocks (A), the above-mentioned term "weight of polymer block or blocks (A)" refers to the total weight of the polymer blocks (A). Similarly in the case when the block copolymer comprises two or more polymer blocks (B), the above-mentioned term "weight of polymer block or blocks (B)" refers to the total weight of the polymer blocks (B).

The content of aromatic vinyl monomer units in the block copolymer of the present invention must be in the range of 30 to 52% by weight, preferably 42 to 52% by weight, based on the total weight of the block copolymer. When the content of aromatic vinyl monomer units in the block copolymer is in this range, the block copolymer can easily be dried in the production process, and, when it is used as a modifier for a resin, the resulting resin composition exhibits far better-balanced impact resistance and transparency. If the content of aromatic vinyl monomer units in the block copolymer is smaller than 30% by weight, the resulting resin composition exhibits poor transparency. In contrast, the content of aromatic vinyl monomer units exceeds 52% by weight, the block copolymer becomes difficult to dry in the production process, and the resulting resin composition also exhibits poor transparency and poor impact resistance.

The content of conjugated diene monomer units in the block copolymer of the present invention is preferably in the range of 48 to 70% by weight, more preferably 48 to 58%) by weight, based on the total weight of the block copolymer.

The content of the optional monomer units, other than the conjugated diene monomer units and the aromatic vinyl monomer units, in the block copolymer of the present invention is not particularly limited, but is preferably not lager than 22% by weight and more preferably not larger than 10% by weight, based on the total weight of the block copolymer.

The block copolymer of the present invention must have an aromatic vinyl block ratio of smaller than 69% by weight, preferably smaller than 65% by weight, based on the total weight of the block copolymer. If the aromatic vinyl block ratio of the block copolymer is too large, the block copolymer becomes difficult to dry in the production process. The lower limit of the aromatic vinyl block ratio is not particularly limited, but, the aromatic vinyl block ratio is usually at least 5% by weight, preferably at least 10% by weight. When the aromatic vinyl block ratio is too small, the resin composition comprising a base resin and the block copolymer is liable to have poor transparency. By the term "aromatic vinyl block ratio" as used herein, we mean the proportion of the amount of aromatic vinyl monomer units constituting a chain consisting only of aromatic vinyl monomer units and having a molecular weight of at least about 1,000, to the total amount of the aromatic vinyl monomer units in the block copolymer. More specifically the aromatic vinyl block ratio" can be determined by an osmic acid decomposition method as described in I. M. Kolthoff et al, J. Polym. Sci., 1, 429(1948).

The proportion of vinyl bond (i.e., the sum of 1,2-vinyl bond and 3,4-vinyl bond) in the portion of conjugated diene monomer units in the block copolymer of the present invention is not particularly limited, but the proportion of vinyl bond is preferably in the range of 2 to 40%, more preferably 5 to 35% and especially preferably 8 to 30%, based on the total conjugated diene monomer units in the block copolymer, to give a resin composition comprising a base resin and the block copolymer which exhibits improved impact resistance and transparency.

The viscosity of a 5% by weight solution in styrene of the block copolymer of the present invention must be at least 5 mPa·s but smaller than 30 Pa·s. Preferably the viscosity of a 5% by weight solution in styrene is in the range of 7 to 28 mPa·s. If the viscosity of a 5% by weight solution in styrene of the block copolymer is too low, the resin comprising a base resin and the block copolymer has poor impact strength.

The block copolymer of the present invention preferably has a weight average molecular weight (Mw) in the range of 50,000 to 500,000, more preferably 100,000 to 450,000 and especially preferably 150,000 to 400,000 as measured by gel permeation chromatography and as expressed in terms of that of polystyrene. When the weight average molecular weight is too low, the resin comprising a base resin and the block copolymer is liable to have poor impact strength. In contrast, when the weight average molecular weight is too high, a solution of the block copolymer in a solvent tends to have undesirably large solution viscosity and the block copolymer is liable to become difficult to handle in the production process of the block copolymer.

The molecular weight distribution as defined by a ratio (Mw/Mn) of weight average molecular weight (Mw) to number average molecular weight (Mn) of the block copolymer as measured by gel permeation chromatography and as expressed in terms of those of polystyrene is preferably in the range of 1.0 to 1.5. When the molecular weight distribution (Mw/Mn) is too broad, the resin comprising a base resin and the block copolymer is liable to have poor impact strength.

The block aromatic vinyl portion in the block copolymer of the present invention preferably has a weight average molecular weight (Mw) in the range of 1,000 to 70,000, more preferably 2,000 to 20,000 and especially preferably 3,000 to 16,000. When the weight average molecular weight of the block aromatic vinyl portion is too low, the resulting resin composition is liable to have poor transparency. In contrast, when the weight average molecular weight of the block aromatic vinyl portion is too high, the block copolymer tends to be difficult to dry in the production process. The molecular weight distribution (Mw/Mn) of the block aromatic vinyl portion of the block copolymer of the present invention is preferably in the range of 1.0 to 3.0, more preferably 2.0 to 3.0. The weight average molecular weight (Mw) and molecular weight distribution (Mw/Mn) of the aromatic vinyl portion of the block copolymer are determined by the above-mentioned osmic acid decomposition method where the measurement is conducted on a filtrate by gel permeation chromatography and expressed in terms of that of polystyrene.

The Mooney viscosity ($ML_{1+4}$, 100° C.) of the block copolymer of the present invention is not particularly limited but is usually in the range of 40 to 110, and preferably 45 to 100. When the Mooney viscosity is too low, the resin composition comprising a base resin and the block copolymer is liable to have poor impact strength. In contrast, when the Mooney viscosity is too high, the block copolymer tends to become difficult to dry in the production process.

The block copolymer of the present invention can be produced by the conventional polymerization procedure adopted for the production of the hitherto known block copolymers. For example, polymerization procedures such as bulk polymerization, solution polymerization, slurry polymerization and vapor phase polymerization can be adopted. Of these, a solution polymerization procedure is preferable. More specifically a multi-stage polymerization method is especially preferably adopted wherein a first monomer for forming one polymer block is polymerized using a polymerization initiator in a solvent in a first polymerization stage, and, when the first monomer is converted to the polymer block, a second monomer for forming another polymer block is added to the polymerization mixture to conduct polymerization in a second polymerization stage (if desired, the procedure of adding another monomer when the second monomer is converted to the polymer block may be repeated).

In the case when the block copolymer of the present invention is produced by the above-mentioned multi-stage polymerization method, the amount of first monomer used for the first polymerization stage is preferably 30 to 90% by weight, more preferably 40 to 85% by weight and especially preferably 50 to 80% by weight, based on the total weight of the monomers used for forming the block copolymer. When the amount of first monomer is too small, the resulting block copolymer has a broad molecular weight distribution (Mw/Mn), and therefore, a resin composition comprising a base resin and the block copolymer is liable to have poor impact strength.

A polymerization initiator used for the production of the block copolymer of the present invention includes organic alkali metal compounds and organic alkaline earth metal compounds, which are generally known as exhibiting a catalytic activity for anion polymerization of conjugated monomers.

Preferable examples of the organic alkali metal compounds are organic lithium compounds having at least one lithium atom in the molecule, and, as specific examples thereof there can be mentioned organic monolithium compounds such as ethyllithium, n-propyllithium, isopropyllithium, n-butyllithium, sec-butyl lithium, tert-butyllithium, hexyllithium, phenyllithium, stilbenelithium, dialkylaminolithium, diphenylaminolithium and di-trimethylsilylaminolithium; organic dilithium compounds such as methylenedi lithium, tetramethylenedilithium, hexamethylenedilithium, isoprenyl-dilithium and 1,4-dilithio-ethylcyclohaxane; and organic trilithium compounds such as 1,3,5-trilithiobenzene. Of these, organic monolithium compounds are especially preferable.

As specific examples of the organic alkaline earth metal compounds used as the polymerization initiator, there can be mentioned n-butylmagnesium bromide, n-hexylmagnesium bromide, ethoxycalcium, calcium stearate, tert-butoxystrontium, ethoxybarium, isopropoxybarium, ethylmercaptobarium, tert-butoxybarium, phenoxybarium, diethylaminobarium, barium stearate and ethylbarium.

The polymerization initiator used for the production of the block copolymer of the present invention is not limited to those which are recited above, and further includes those which form a uniform solution in an organic solvent and exhibits catalytic activity for living polymerization, such as, for example, composite catalysts comprising a lanthanoid series rare earth metal compound such as a neodymium-, samarium- or gadolinium-containing compound with alkylaluminum, alkylaluminum halide and alkylaluminum hydride; and metallocene catalysts containing titanium, vanadium, samarium or gadolinium.

The polymerization initiators may be used either alone or as a combination of at least two thereof.

The amount of polymerization initiator varies depending upon the molecular weight of the target block copolymer and is not particularly limited. Usually the amount of polymerization initiator is in the range of 2 to 33 millimoles, preferably 3 to 20 millimoles and more preferably 4 to 14 millimoles, based on 1,000 g of the total monomers used for the production of the block copolymer.

The solvent used for polymerization is not particularly limited provided that it is inactive to the polymerization initiator. The solvent includes, for example, chainlike hydrocarbon solvents, cyclic hydrocarbon solvents and mixtures of these solvents. The chainlike solvents include, for example, chainlike alkanes and alkenes having 4 to 5 carbon atoms, such as n-butane, isobutene, 1-butene, isobutylene, trans-2-butene, cis-2-butene, 1-pentene, trans-2-pentene, cis-2-pentene, n-pentane, isopentane and neopentane. The cyclic hydrocarbon solvents include, for example, aromatic hydrocarbons such as benzene, toluene and xylene, and alicyclic hydrocarbons such as cyclopentane and cyclohexane. These solvents may be used either alone or as a mixture of at least two thereof.

The amount of solvent used for polymerization is not particularly limited, but is preferably such that the concentration of the block copolymer in a polymer solution as formed by polymerization is in the range of 5 to 50% by weight, more preferably 10 to 40% by weight and especially preferably 20 to 30% by weight.

In the polymerization step for producing the block copolymer, a polar compound can be added in a polymerization mixture to control the structure of each polymer block in the block copolymer. The polar compound includes Lewis base compounds, and, as specific examples thereof there can be mentioned ethers such as tetrahydrofuran, diethyl ether, dioxane, ethylene glycol dimethyl ether, ethylene glycol dibutyl ether, diethylene glycol dimethyl ether and dielhylene glycol dibutyl ether; tertiary amines such as tetarmethylethylenediamine, trimethylamine, triethylamine, pyridine and quinuclidine; alkali metal alkoxides such as potassium-t-amyl oxide and potassium-t-butyl oxide; and phosphines such as triphenyl-phosphine. These polar compounds can be appropriately chosen provided that the object of the present invention is achieved, and they may be used either alone or as a combination of at least two thereof. The amount of these polar compounds is usually in the range of 0.005 to 1 mole per mole of the metal atom contained in the polymerization initiator.

The polymerization temperature for the production of the block copolymer is usually in the range of 10 to 150° C., preferably 30 to 130° C. and more preferably 40 to 90° C. The time required for the polymerization varies depending upon the other conditions, but is usually within 48 hours, and preferably in the range of 0.5 to 10 hours. In the case when the polymerization temperature is difficult to control, the polymerization temperature is preferably controlled at reflux in a reaction vessel equipped with a reflux condenser. Preferably the polymerization is carried out in an inert gas atmosphere such as nitrogen gas. The polymerization pressure is not particularly limited provided that the mixture of monomers and solvent can be maintained in a liquid state in the above-mentioned range of polymerization temperature.

When the polymerization is completed, there can be added a polymerization terminator such as water, methanol, ethanol, propanol, hydrochloric acid or citric acid; an antioxidant such as a phenolic antioxidant, a phosphorus-containing antioxidant or an amine antioxidant; extender oil such as mineral or synthetic extender oil, and then, the block copolymer is recovered from the polymer solution. For the recovery of the block copolymer, a known method can be adopted, which includes, for example, a direct drying method for removing the solvent from the polymer solution, and a conventional steam stripping method which is widely adopted for the separation of polymer.

In the case when the block copolymer is recovered as a slurry, for example, by a steam striping method, the recovered slurry is usually dehydrated by a dehydrator such as extruder-type squeezer to give a crumb having moisture content not higher than a predetermined value, and then the crumb is dried by a dryer such as, for example, a band dryer or an expansion extruder-type dryer. The block copolymer of the present invention can be dried at an enhanced efficiency and the volatile content can be reduced to a desired value (e.g., below 1.0% by weight), as compared with other polymer rubbers conventionally used for modification of resins. The thus-obtained dried crumb can be pelletized, for example, by an extruder, or can baled by a baling machine.

As mentioned above, the block copolymer of the present invention can easily be dried in the production process, and, when the block copolymer is incorporated in a base resin, a resin composition having improved impact resistance and transparency can be obtained. Thus the block copolymer of the present invention is especially suitable as a modifier for a resin.

The resin composition according to the present invention comprise the above-mentioned block copolymer according to the present invention and a base resin. The base resin used for the preparation of the resin composition is not particularly limited, but is preferably a transparent resin for giving a resin composition having a high transparency, which is a desired resin composition to be prepared from the block copolymer of the present invention.

As specific examples of the transparent resin, there can be mentioned resins comprising units of methyl acrylate monomer or methyl methacrylate monomer, such as a methyl methacrylate resin, a methyl acrylate resin, a methyl methacrylate-butadienc-styrene resin, a methyl methacrylate-styrene resin, a methyl acrylate-butadiene-styrene resin, a methyl acrylate-styrene resin, a methyl methacrylate-ethyl acrylate-styrene resin, a methyl methacrylate-butyl acrylate-styrene resin and an acrylonitrile-acrylate-styrene resin; an acrylonitrile-ethylene-styrene resin; an acrylonitrile-styrene resin; an acrylonitrile-butadiene-styrene resin; a polystyrene resin; a high-impact polystyrene resin; an ethyl acrylate resin; an ethyl acrylate-butadiene-styrene resin; and an ethyl acrylate-styrene resin. Of these, resins comprising units of methyl acrylate monomer or methyl methacrylate monomer are preferable in view of the high transparency of the resulting resin composition.

Resins other than the above-mentioned transparent resins can also be used for the preparation of the resin composition according to the present invention. As specific examples of such resins, there can be mentioned olefin resins such as polyethylene and polypropylene; polyphenylene ether; polyamides; polycarbonate; polyacetals; polyesters such as polyethylene terephthaiate and polybutylene terephthalate; polyphenylene sulfide; polyarylates; polysulfones; polyether sulfones; polyether ether ketones; and polyether imides.

The base resin may be used either alone or as a combination of at least two thereof.

Of the methyl acrylate monomer units and/or methyl methacrylate monomer units contained in the base resin, methyl methacrylate monomer units are especially preferable.

In the case when the resin composition is used in the field of optical goods such as lenses and optical films, the base resin preferably comprises units of an aromatic vinyl monomer, in addition to the units of methyl acrylate monomer or methyl methacrylate monomer. As specific examples of the monomers for the units of an aromatic vinyl monomer, there can be mentioned those which are recited hereinbefore as the monomers used for the units of aromatic vinyl monomer in the polymer block or blocks (A). Of these, styrene is especially preferable because it gives a resin composition having a high transparency. The aromatic vinyl monomer may be used either alone or as a combination of at least two thereof.

The base resin comprising the units of methyl acrylate monomer or methyl methacrylate monomer preferably further comprises units of an acrylic acid alkyl ester monomer other than the methyl acrylate monomer because the base resin gives a resin composition having good mechanical strength and good weather resistance. As specific examples of the acrylic acid alkyl ester monomer, there can be mentioned ethyl acrylate, propyl acrylate, n-butyl acrylate, sec-butyl acrylate and 2-ethylhexyl acryalte. These acrylic acid alkyl ester monomers may be used either alone or as a combination of at least two thereof.

To give a resin composition having especially high transparency, a base resin having substantially the same refractive index as that of the block copolymer of the present invention is preferably used. For preparing the base resin having substantially the same refractive index as that of the block copolymer, the composition of the monomer units in the base resin may be varied according to the refractive index of the block copolymer. The refractive index of the block copolymer also varies depending upon the composition of the monomer units of the block copolymer.

The amount of the block copolymer in the resin composition is such that the ratio of the block copolymer to the base resin is usually in the range of 2/98 to 25/75 by weight, preferably 3/97 to 20/80 by weight and more preferably 5/95 to 15/85 by weight. When the proportion of the block copolymer is too large, the resin composition tends to have poor mechanical strength. In contrast, when the proportion of the base resin is too large, the resin composition tends to have poor impact resistance.

The block copolymer within the resin composition preferably has an average particle diameter in the range of 0.05 to 2.0 μm, more preferably 0.10 to 1.5 μm. When the average particle diameter of the block copolymer within the resin composition is within this range, the resin composition exhibits highly balanced impact resistance and transparency.

The resin composition of the present invention can have various ingredients incorporated therein, which are conventionally used in the resin industry, provided that the effect of the invention can be attained. The ingredients include, for example, mineral oil, liquid paraffin, organic and inorganic fillers, a heat stabilizer, a weather stabilizer, a light stabilizer and other stabilizers, a plasticizer, a lubricant, a ultraviolet absorber, a colorant, a pigment, a mold release agent, an antistatic agent and a fire retardant.

The process for producing the resin composition of the present invention is not particularly limited, and includes, for example, a process wherein the base resin and the above-mentioned block copolymer are mixed together by an appropriate procedure, and a process wherein a monomer to be used for the preparation of the base resin (which monomer is hereinafter called as "monomer for resin" when appropriate) is polymerized in the presence of the block copolymer. The latter process is preferable because a resin composition having excellent impact resistance can be obtained.

The mixing of the base resin with the block copolymer can be conducted by using mixing kneaders such as a single screw extruder or a multiple screw extruder such as a twin screw extruder, a Banbury mixer, a roll and a kneader. The mixing temperature is preferably in the range of 100 to 250° C.

In the process for polymerizing a monomer for resin in the presence of the block copolymer, a liquid for polymerization is prepared by dissolving or dispersing the block copolymer in the monomer for resin, and the liquid for polymerization is polymerized in a polymerization vessel. The polymerization procedure is not particularly limited, and any of bulk polymerization procedure, suspension polymerization procedure, solution polymerization procedure and emulsion polymerization procedure can be adopted.

A polymerization initiator used for the polymerization of the monomer for resin is not particularly limited, but an organic peroxide is preferably used. The organic peroxide used as the polymerization initiator preferably includes those which exhibit a temperature in the range of 75 to 170° C. which corresponds to a half-life of 10 hours. As specific examples of such organic peroxide, there can be mentioned peroxy ketals such as 1,1-di-tert-butyl peroxycyclohexane, 1,1-di-tert-butyl peroxy-3,3,5-trimethylcyclohexane, 2,2-di-tert-butyl peroxyoctane, n-butyl-4,4-di-tert-butyl peroxyvalerate and 2,2-di-tert-butyl peroxybutane; and peroxy esters such as tert-butyl peroxyacetate, tert-butyl peroxy-3,5,5-trimethylhexanoate, tert-butyl peroxylaurate, tert-butyl peroxybenzoate, di-tert-butyl diperoxyisophtbalate, 2,5-dimethyl-2,5-dibenzoyl peroxyhexane, tert-butyl peroxymaleate, tert-butyl peroxyisopropyl carbonate, di-tert-butyl peroxide, dicumyl peroxide, tert-butyl hydroperoxide and cumene hydroperoxide. These organic peroxides used as a polymerization initiator may be used either alone or as a combination of at least two thereof. The amount of the organic peroxide is preferably in the range of 0.005 to 0.04 parts by weight based on 100 parts by weight of the monomer for resin.

EXAMPLES

The invention will now be specifically described by the following examples and comparative examples wherein parts and % are by weight unless otherwise specified.

Characteristics of block copolymers, base resins and resin compositions were evaluated by the following methods.

[Molecular Weight of Block Copolymer]

Molecular weights were expressed in terms of that of polystyrene as measured by gel permeation chromatography using tetrahydrofuran as carrier. More specifically, a high speed liquid chromatography apparatus HLC8220 (available from Tosoh Corporation), and two columns GMH-HR—H (available from Tosoh Corporation) were used. A differential refractometer and a ultraviolet visible spectrophotometer (detection wavelength 254 nm) were used as detectors. Measurement was made using 1 ml of a polymer solution in tetrahydrofuran with a concentration of 0.045% as a test sample. The volume rate in flow at measurement was 1 ml/min.

[Monomer Units Content in Block Copolymer and Vinyl Bond Content in Conjugated Diene Monomer Units Portion in Block Copolymer]

Measurements of the monomer unit contents and the vinyl bond content were made by proton NMR using a 400-MHz-NMR apparatus (available from JEOL Co.).

[Aromatic Vinyl Block Ratio (Styrene Block Ratio) of Block Copolymer]

Measurement of the styrene block ratio was made by an osmic acid decomposition method.

[Molecular Weight of Block Aromatic Vinyl Portion in Block Copolymer]

Molecular weights were measured by the same method as adopted for the measurement of the molecular weight of block copolymer, as mentioned above, on a test sample of a filtered fraction obtained by an osmic acid decomposition method.

[Glass Transition Temperature of Polymer Block]

A glass transition temperature of block copolymer was measured using a differential Scan Calorimeter (available from Perkin-Elmer Corporation) under the following conditions. The temperature of a test sample was elevated from room temperature (23° C.) to 120° C., maintained at 120° C. for 10 minutes, lowered to −120° C. at a lowering rate of 100° C./min, maintained at −120° C. for 10 minutes, and then elevated to 150° C. at an elevation rate of 60° C./min. Glass transition temperature was expressed as an average value at two medial points.

[Viscosity of 5% Styrene Solution of Block Copolymer]

Measurement was made by Ostwald viscometer at 25° C.

[Mooney Viscosity of Block Copolymer]

Mooney viscosity ($ML_{1+4}$, 100° C.) of block copolymer was measured according to JIS K6300.

[Residual Volatile Content in Block Copolymer]

A crumb of block copolymer was dried at 110° C. in an oven for one hour, and, the residual volatile content ($V_0$) in the block copolymer was calculated from the following formula.

$$V_0(\%) = [(S-B_0)/S] \times 100$$

where S and $B_0$ are weight of crumb as measured before and after the drying, respectively.

[Total Luminous Transmittance of Resin Composition]

Total luminous transmittance was measured according to ASTM D1003. The larger the total luminous transmittance, the better the transparency.

[Tensile Strength at Yield Point and Tensile Elongation at Break of Resin Composition]

These characteristics were measured at a drawing rate of 50 mm/min according to JIS K7113.

[Charpy Impact Resistance of Resin Composition]

A test sample of resin composition was prepared and Charpy impact resistance was measured according to JIS K7111 (notched).

The production processes for preparing block copolymers used in the Examples and Comparative Examples were as follows.

Example 1

A 2,000 liter volume autoclave equipped with a condenser, a stirrer and a jacket was charged with 600 kg of a mixed solvent comprised of 30% of n-butane and 70%) of cyclohexane, 14.8 kg of styrene and 30.2 kg of 1,3-butadiene, and further 0.17 mole of tetramethyl ethylene diamine was added. The temperature of the content was adjusted to 50° C. A solution of 0.9 mole/liter of n-butyllithium in hexane was carefully and gradually dropwise added to the content in the autoclave, while the pressure increase and the temperature elevation were observed, until immediately before the proceeding of polymerization reaction to thereby titrate the ingredients of deactivating the polymerization reaction. Then a previously prepared n-butyllithium solution in hexane of the same concentration as mentioned above was added to the content in the autoclave in an amount of 1.0 mole as the amount of lithium in the content to thereby initiate the polymerization. When 10 minutes elapsed from the initiation of polymerization, 7.7 kg of styrene and 37.3 kg of 1,3-butadiene were added over a period of 60 minutes. When 30 minutes elapsed from the initiation of polymerization, the temperature reached 80° C. The content was maintained at 80° C. by controlling the condenser. When 30 minutes elapsed from the addition of monomers in the latter stage, the conversion substantially reached 100% which showed the substantial absence of unreacted monomers.

Then 45.0 kg of styrene and 15.0 kg of 1,3-butadiene were added to the polymerization mixture over a period of 30 minutes. When 40 minutes elapsed from the completion of monomer addition, the polymerization conversion reached substantially 100% which revealed the absence of unreacted monomers. Then 2.00 moles of isopropyl alcohol was added to stop the polymerization. After termination of the polymerization, 270 g (0.18 part, based on 100 parts of the block copolymer) of antioxidanr ["Irganox 1520" available from Ciba Specialty Chemicals Co.] was added and the mixture was rendered uniform. The uniform mixture was subjected to steam stripping to remove solvent to give a slurry of a block copolymer.

Thereafter the temperature of the slurry of block copolymer was adjusted to about 70° C., and the slimy was dehydrated by using an extrusion type squeezer (total length: 890 mm, diameter: 230 mm, length of portion having slit: 482 mm, slit width: 0.1 mm, revolution of drawing: 100 rpm, temperature: 40° C.) to give a crumb having a water content of about 10 to 15%. The crumb was dried by an expansion extrusion dryer (total length: 1200 mm, diameter: 250 mm) maintained at 135° C. The die head of the dryer was maintained at about 150° C. A part of the extruded crumb was tested for determination of its residual volatile content. The remainder of the extruded crumb was further dried by a warm air dryer (temperature: 70° C., flow rate of air: 100 liter/min, residence time: 10 min), connected downward from the expansion extrusion dryer, to give a block copolymer of Example 1. The polymerization conditions are shown in Table 1.

The thus-obtained block copolymer of Example 1 was evaluated for the following properties. Residual volatile content, molecular weight, glass transition temperature, bound styrene content (content of aromatic vinyl monomer units), bound butadiene content (content of conjugated diene monomer units), vinyl bond content, styrene block ratio (aromatic vinyl block ratio), molecular weight of styrene block, Mooney viscosity, and viscosity of 5% by weight solution in styrene. The evaluation results are shown in Table 2.

Examples 2-8, Comparative Examples 1-5

By the same procedures and conditions as employed in Example 1, block copolymers of Examples 2-8 and Comparative Examples 1-5 were produced wherein the amounts of n-butyllithium (expressed as the amount of lithium by mol), styrene, 1,3-butadinene and tetramethyl ethylene diamine were varied as shown in Table 1. All other conditions remained the same. Properties of the block copolymers of Examples 2-8 and Comparative Examples 1-5 were evaluated by the same methods as in Example 1. The evaluation results are shown in Table 2.

TABLE 1

| | Example | | | | | | | | Comparative Example | | | | |
|---|---|---|---|---|---|---|---|---|---|---|---|---|---|
| Amounts of ingreduents added | 1 | 2 | 3 | 4 | 5 | 6 | 7 | 8 | 1 | 2 | 3 | 4 | 5 |
| n-BuLi (mol) | 1.00 | 1.00 | 1.00 | 0.83 | 1.36 | 1.00 | 0.94 | 1.36 | 1.36 | 1.00 | 0.94 | 1.00 | 1.36 |
| Tetramethyl ethylene diamine (mol) | 0.17 | 0.17 | 0.01 | 0.21 | 0.20 | 0.17 | 0.06 | 0.20 | 0.25 | 0.17 | 0.16 | 0.17 | 0.19 |
| First stage polymerization [polymer block (A)] At initiation of polymerization | | | | | | | | | | | | | |
| Styrene (kg) | 14.8 | 17.1 | 13.5 | 19.8 | 7.2 | 9.3 | 2.4 | 5.6 | 2.2 | 2.6 | 31.8 | 15.3 | 1.0 |
| 1,3-Butadiene (kg) | 30.2 | 30.2 | 30.6 | 32.7 | 32.7 | 23.8 | 32.3 | 40.6 | 28.3 | 21.0 | 31.8 | 23.0 | 48.4 |
| 10 minutes after initiation of polymerization | | | | | | | | | | | | | |
| Styrene (kg) | 7.7 | 8.5 | 7.1 | 9.5 | 3.3 | 2.6 | 1.6 | 2.2 | 0 | 1.1 | 21.1 | 6.1 | 0 |
| 1,3-Butadiene (kg) | 37.3 | 41.7 | 41.8 | 43.0 | 39.3 | 43.9 | 50.7 | 49.0 | 52.0 | 36.8 | 50.2 | 35.1 | 70.6 |

TABLE 1-continued

| Amounts of ingreduents added | Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Second stage polymerization [polymer block (B)] At initiation of 2nd stage polymerization | | | | | | | | | | | | | |
| Styrene (kg) | 45.0 | 43.3 | 47.0 | 38.2 | 57.3 | 64.1 | 56.5 | 49.0 | 65.3 | 86.3 | 14.5 | 46.0 | 29.0 |
| 1,3-Butadiene (kg) | 15.0 | 9.2 | 10.0 | 6.8 | 10.2 | 6.4 | 6.5 | 3.5 | 2.2 | 2.2 | 0.5 | 24.5 | 1.0 |
| Ratio of polymer block (A)/polymer block (B) (wt. ratio) | 1.5 | 1.9 | 1.6 | 2.3 | 1.2 | 1.1 | 1.4 | 1.9 | 1.2 | 0.7 | 9.0 | 1.1 | 4.0 |

TABLE 2

| | Example | | | | | | | | Comparative Example | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Glass transition temperature (° C.) | | | | | | | | | | | | | |
| Polymer block (A) (Low Tg block) | −58 | −51 | −60 | −51 | −69 | −75 | −84 | −82 | −86 | −87 | −38 | −51 | −89 |
| Polymer block (B) (High Tg block) | 47 | 63 | 63 | 64 | 67 | 84 | 80 | 86 | 103 | 93 | 94 | 28 | 102 |
| Content of monomer units (wt. %) | | | | | | | | | | | | | |
| Bound styrene content | 45.3 | 45.7 | 45.7 | 45.0 | 45.0 | 51.0 | 40.0 | 37.5 | 44.5 | 60.0 | 45.0 | 45.0 | 20.0 |
| Bound 1,3-butadiene content | 54.7 | 54.3 | 54.3 | 55.0 | 55.0 | 49.0 | 60.0 | 52.5 | 55.5 | 40.0 | 55.0 | 55.0 | 80.0 |
| Vinyl bond content (%) | 20.0 | 20.6 | 10.0 | 21.0 | 20.0 | 20.0 | 11.5 | 20.0 | 21.9 | 20.0 | 20.4 | 20.2 | 18.0 |
| Styrene block ratio (wt. %) | 60 | 60 | 60 | 59 | 36 | 58 | 62 | 41 | 97 | 85 | 53 | 69 | 98 |
| Weight average molecular weight of styrene block ($\times 10^{-4}$) | 0.48 | 0.75 | 0.75 | 0.88 | 0.54 | 1.52 | 1.44 | 1.52 | 6.30 | 13.00 | 4.46 | 0.34 | 6.70 |
| Weight average molecular weight ($\times 10^{-4}$) | 25.8 | 24.7 | 24.8 | 29.8 | 16.8 | 25.1 | 27.2 | 17.0 | 16.7 | 24.9 | 27.2 | 25.2 | 16.8 |
| Viscosity of 5 wt. % solution in styrene (mPa·s) | 21 | 20 | 20 | 28 | 10 | 20 | 23 | 10 | 10 | 20 | 23 | 21 | 10 |
| Mooney viscosity ($ML_{1+4}$, 100° C.) | 77 | 88 | 90 | 89 | 95 | 110 | 105 | 100 | 150 | 120 | 126 | 66 | 154 |
| Residual volatile content (wt. %) | | | | | | | | | | | | | |
| As mesured after extrusion and drying | 1.29 | 1.63 | 1.65 | 1.48 | 2.06 | 2.10 | 2.05 | 1.85 | 4.99 | 5.44 | 4.56 | 2.06 | 2.50 |
| As mesured after hot air drying | 0.28 | 0.66 | 0.65 | 0.42 | 0.66 | 0.76 | 0.75 | 0.7 | 4.31 | 4.68 | 3.43 | 0.56 | 0.95 |

Resin compositions were prepared from the block copolymers produced in the above-mentioned examples and comparative examples. The details for the preparation of the resin compositions are shown below.

Production of Resin Compositions

A 20 liter completely stirred reactor equipped with a stirring blade was charged 9.0 parts of the block copolymer produced in each of Examples 1-8 and Comparative Examples 1-5, and further with styrene, methyl methacrylate, butyl acrylate and ethyl benzene in amounts shown in Table 3, to give 100 parts of a mixed solution. Thus the amounts of styrene and methyl methacrylate were set so as to give a base resin having the same refractive index as that of the block copolymer used. To the mixed solution, 0.02 part of 1,1-bis(tert-butylperoxy)-3,3,5-trimethylcyclohexane and 0.07 part of n-dodecyl mercaptan were added, and the temperature of the mixed liquid was elevated to 135° C. while being stirred by the stirring blade at a revolution rate of 150 rpm, whereby the polymerization was initiated. When the mixed liquid was maintained at 135° C. for 120 minutes, it was confirmed that the polymerization conversion reached about 40%. Then the temperature of the mixed liquid was elevated to 150° C. When the mixed liquid was maintained at 150° C. for 120 minutes, it was confirmed that the polymerization conversion reached about 80%. The thus-obtained polymerization liquid was put into a vented extruder where volatile matter was removed at 230° C. under a reduced pressure to give a bulky resin composition. The bulky resin composition was granulated into pellets. The resin compositions of Examples 1-8 and Comparative Examples 1-5 in the form of pellets were evaluated for their total luminous transmittance, tensile strength at yield point, tensile elongation at break and Charpy impact strength. The evaluation results are shown in Table 3.

TABLE 3

|  | Example | | | | | | | | Comparative Example | | | | |
| --- | --- | --- | --- | --- | --- | --- | --- | --- | --- | --- | --- | --- | --- |
|  | 1 | 2 | 3 | 4 | 5 | 6 | 7 | 8 | 1 | 2 | 3 | 4 | 5 |
| Amount added (parts by weight) | | | | | | | | | | | | | |
| Block copolymer | 9.0 | 9.0 | 9.0 | 9.0 | 9.0 | 9.0 | 9.0 | 9.0 | 9.0 | 9.0 | 9.0 | 9.0 | 9.0 |
| Styrene | 43.8 | 43.8 | 43.8 | 43.8 | 43.8 | 43.3 | 44.3 | 44.5 | 43.9 | 42.5 | 43.8 | 43.8 | 46.1 |
| Methyl methacrylate | 31.8 | 31.8 | 31.8 | 31.8 | 31.8 | 32.3 | 31.3 | 31.1 | 31.7 | 33.1 | 31.8 | 31.8 | 29.5 |
| Butyl acrylate | 10.3 | 10.3 | 10.3 | 10.3 | 10.3 | 10.3 | 10.3 | 10.3 | 10.3 | 10.3 | 10.3 | 10.3 | 10.3 |
| Ethylbenzene | 5.1 | 5.1 | 5.1 | 5.1 | 5.1 | 5.1 | 5.1 | 5.1 | 5.1 | 5.1 | 5.1 | 5.1 | 5.1 |
| Physical properties of resin composition | | | | | | | | | | | | | |
| Total luminous transmittance (%) | 92 | 92 | 92 | 93 | 92 | 93 | 92 | 93 | 86 | 85 | 88 | 84 | 83 |
| Tensile strength at yield point (MPa) | 550 | 550 | 550 | 540 | 560 | 560 | 550 | 560 | 550 | 560 | 550 | 550 | 550 |
| Tensile elongation at break (%) | 20 | 20 | 25 | 20 | 25 | 25 | 20 | 20 | 20 | 20 | 10 | 15 | 10 |
| Charpy impact resistance (J/cm$^2$) | 0.9 | 0.8 | 0.7 | 0.9 | 0.7 | 0.7 | 0.7 | 0.7 | 0.6 | 0.5 | 0.4 | 0.4 | 0.4 |

The block copolymers of Examples 1-8 exhibited a residual volatile content of not larger than 2.10% as measured after extrusion and drying, and a residual volatile content of not larger than 0.76% as measured after hot air drying, as seen from Table 2, and therefore, these block copolymers could be easily dried. As seen from Table 3, the resin compositions of Examples 1-8 prepared from the block copolymers of Examples 1-8 exhibited a total luminous transmittance of at least 92% and a Charpy impact strength of at least 0.7 J/cm$^2$. Thus, these resins compositions had good transparency and good impact strength.

In contrast, the block copolymer of Comparative Example 1 having a polymer block B (i.e., the polymer block having a relatively high glass transition temperature) with a too high glass transition temperature and exhibiting a too high styrene block ratio, exhibited large residual volatile contents as measured after extrusion and drying, and also as measured after hot air drying. Therefore, this block copolymer was difficult to dry, and the resin composition of Comparative Example 1, prepared from the block copolymer, exhibited a low total light transmittance and thus had poor transparency.

The block copolymer of Comparative Example 2 having a too large bound styrene content and a too high styrene block ratio exhibited large residual volatile contents as measured after extrusion and drying, and also as measured after hot air drying. Therefore, this block copolymer was difficult to dry, and the resin composition of Comparative Example 2, prepared from the block copolymer, exhibited a low total light transmittance and thus had poor transparency.

The block copolymer having a polymer block A (i.e., the polymer block having a relatively low glass transition temperature) with a too high glass transition temperature and having a polymer block B (i.e., the polymer block having a relatively high glass transition temperature) with a too high glass transition temperature exhibited large residual volatile contents as measured after extrusion and drying, and also as measured after hot air drying. Therefore, this block copolymer was difficult to dry, and the resin composition of Comparative Example 3, prepared from this block copolymer, exhibited a low total light transmittance and thus had poor transparency, and further exhibited a low Charpy impact strength and thus had poor impact strength.

The resin composition of Comparative Example 4, prepared from the block copolymer of Comparative Example 4 having a polymer block B (i.e., the polymer block having a relatively high glass transition temperature) with a too low glass transition temperature, exhibited a low total light transmittance and thus had poor transparency.

The resin composition of Comparative Example 5, prepared from the block copolymer of Comparative Example 5 having a too small bound styrene content exhibited a low total light transmittance and thus had poor transparency.

Industrial Applicability

The block copolymer according to the present invention can easily be dried in the production process, and, when it is used as a modifier for a resin, it can give a modified resin composition having improved impact resistance and transparency.

In view of the above-mentioned beneficial properties, a resin composition comprising the block copolymer of the present invention and a base resin can be widely used, and especially suitable for uses for which excellent impact resistance and transparency are required. For example, the resin composition can be used for optical disks, optical lens, prism, light diffusers, optical cards, optical fibers, optical mirrors, liquid crystal display element boards, light guides, polarizing films, retardation films, personal computer peripheral devices, OA instruments, food containers, medical instrument parts, food packaging vessels, furniture, stationery and sundry goods.

The invention claimed is:

1. A block copolymer comprised of a polymer block or blocks (A) comprising conjugated diene monomer units and a polymer block or blocks (B) comprising conjugated diene monomer units and aromatic vinyl monomer units, wherein the block copolymer satisfies the following requirements (1) through (8):

(1) the polymer block or blocks (A) have a glass transition temperature in the range of −88 to −45° C.,
(2) the polymer block or blocks (B) have a glass transition temperature in the range of 30 to 90° C.,
(3) the content of aromatic vinyl monomer units in the block copolymer is in the range of 30 to 52% by weight based on the total weight of the block copolymer,
(4) the block copolymer has an aromatic vinyl block ratio of smaller than 69% by weight based on the total weight of the block copolymer,
(5) the viscosity of a 5% by weight solution of the block copolymer in styrene is at least 5 mPa·s but smaller than 30 mPa·s,
(6) the polymer block or blocks (B) contain conjugated diene monomer units and aromatic vinyl monomer units, at a ratio in the range of 1/99 to 50/50 by weight,
(7) the content of vinyl bond in the portion of conjugated diene monomer units in the block copolymer is in the range of 2 to 40% based on the total conjugated diene monomer units in the block copolymer, and (8) the ratio of the polymer block or blocks (A) to the polymer block or blocks (B) is in the range of 1.0 to 9.0 by weight.

2. The block copolymer according to claim 1, wherein the content of conjugated diene monomer units in the block copolymer is in the range of 48 to 70% by weight based on the total weight of the block copolymer.

3. The block copolymer according to claim 1, which has a weight average molecular weight (Mw) in the range of 50,000 to 500,000 as measured by gel permeation chromatography and as expressed in terms of that of polystyrene.

4. The block copolymer according to claim 1, which has a molecular weight distribution as defined by a ratio (Mw/Mn) of weight average molecular weight (Mw) to number average molecular weight (Mn) in the range of 1.0 to 1.5 as measured by gel permeation chromatography and as expressed in terms of those of polystyrene.

5. The block copolymer according to claim 1, wherein a block aromatic vinyl portion in the block copolymer has a weight average molecular weight in the range of 1,000 to 70,000.

6. The block copolymer according to claim 1, wherein the block aromatic vinyl portion in the block copolymer has a weight average molecular weight in the range of 1,000 to 70,000, and has a molecular weight distribution (Mw/Mn) in the range of 1.0 to 3.0.

7. The block copolymer according to claim 1, wherein the polymer block or blocks (A) contain conjugated diene monomer units and aromatic vinyl monomer units, at a ratio in the range of 90/10 to 60/40 by weight.

8. The block copolymer according to claim 7, wherein the polymer block or blocks (B) contain conjugated diene monomer units and aromatic vinyl monomer units, at a ratio in the range of 2/98 to 30/70 by weight.

9. The block copolymer according to claim 1, wherein the ratio of the polymer block or blocks (A) to the polymer block or blocks (B) is in the range of 1.0 to 4.0 by weight.

10. The block copolymer according to claim 1, which is a straight-chain block copolymer represented by the following general formula (1) or (2), $$A\text{-}B \qquad \text{general formula (1):}$$

wherein A represents the polymer block (A) and B represents the polymer block (B), $$A\text{-}(Xi)_n\text{-}B \qquad \text{general formula (2):}$$

wherein A represents the polymer block (A), B represents the polymer block (B), Xi represents a polymer block consisting of conjugated diene monomer units or aromatic vinyl monomer units, and n is an integer of 1 to 10.

11. The block copolymer according to claim 1, which has a Mooney viscosity ($ML_{1+4}$, 100° C.) in the range of 40 to 110.

12. A resin composition comprising a block copolymer comprised of a polymer block or blocks (A) comprising conjugated diene monomer units and a polymer block or blocks (B) comprising conjugated diene monomer units and aromatic vinyl monomer units, and a base resin,
wherein the block copolymer satisfies the following requirements (1) through (6):
(1) the polymer block or blocks (A) have a glass transition temperature in the range of −88 to −45° C.,
(2) the polymer block or blocks (B) have a glass transition temperature in the range of 30 to 90° C.,
(3) the content of aromatic vinyl monomer units in the block copolymer is in the range of 30 to 52% by weight based on the total weight of the block copolymer,
(4) the block copolymer has an aromatic vinyl block ratio of smaller than 69% by weight based on the total weight of the block copolymer,
(5) the viscosity of a 5% by weight solution of the block copolymer in styrene is at least 5 mPa·s but smaller than 30 mPa·s, and
(6) the polymer block or blocks (B) contain conjugated diene monomer units and aromatic vinyl monomer units, at a ratio in the range of 1/99 to 50/50 by weight.

13. The resin composition according to claim 12, wherein the base resin comprises methyl acrylate monomer units or methyl methacrylate monomer units.

14. The resin composition according to claim 13, wherein the base resin further comprises aromatic vinyl monomer units.

15. The resin composition according to claim 13, wherein the base resin further comprises units derived from acrylic or methacrylic acid alkyl ester monomer other than methyl acrylate or methacrylate monomer.

16. The resin composition according to claim 12, wherein the content of the block copolymer in the resin composition is such that the ratio of the block copolymer to the base resin is in the range of 2/98 to 25/75 by weight.

17. The resin composition according to claim 12, wherein the block copolymer in the resin composition has an average particle diameter in the range of 0.05 to 2.0 μm.

18. A process for producing the resin composition as claimed in claim 12, which comprises a step of polymerizing a monomer as raw material for forming the base resin in the presence of the block copolymer.

19. The resin composition according to claim 12, wherein the content of vinyl bond in the portion of conjugated diene monomer units in the block copolymer is in the range of 2 to 40% based on the total conjugated diene monomer units in the block copolymer.

20. The resin composition according to claim 19, wherein the ratio of the polymer block or blocks (A) to the polymer block or blocks (B) is in the range of 1.0 to 9.0 by weight.

21. The resin composition according to claim 12, wherein the content of conjugated diene monomer units in the block copolymer is in the range of 48 to 70% by weight based on the total weight of the block copolymer.

22. The resin composition according to claim 12, wherein the block copolymer is a straight-chain block copolymer represented by the following general formula (1) or (2), $$A\text{-}B \qquad \text{general formula (1):}$$

wherein A represents the polymer block (A) and B represents the polymer block (B), $$A\text{-}(Xi)_n\text{-}B \qquad \text{general formula (2):}$$

wherein A represents the polymer block (A), B represents the polymer block (B), Xi represents a polymer block consisting of conjugated diene monomer units or aromatic vinyl monomer units, and n is an integer of 1 to 10.

23. The resin composition according to claim 12, wherein the polymer block or blocks (B) of the block copolymer contain conjugated diene monomer units and aromatic vinyl monomer units, at a ratio in the range of 2/98 to 30/70 by weight.

24. The resin composition according to claim 12, wherein the polymer block or blocks (A) of the block copolymer contain conjugated diene monomer units and aromatic vinyl monomer units, at a ratio in the range of 90/10 to 60/40 by weight.

25. The resin composition according to claim 24, wherein the polymer block or blocks (B) contain conjugated diene monomer units and aromatic vinyl monomer units, at a ratio in the range of 2/98 to 30/70 by weight.

26. The resin composition according to claim 12, wherein the ratio of the polymer block or blocks (A) to the polymer block or blocks (B) is in the range of 1.0 to 4.0 by weight.

27. A resin-modifying composition, which comprises the block copolymer as claimed in claim 1.

* * * * *